(12) United States Patent
Hattersley et al.

(10) Patent No.: US 9,892,507 B2
(45) Date of Patent: Feb. 13, 2018

(54) PROCESSING OPTICAL COHERENCE TOMOGRAPHY SCANS OF A SUBJECTS SKIN

(71) Applicant: Michelson Diagnostics Ltd., Maidstone, Kent (GB)

(72) Inventors: Simon Hattersley, Bromley (GB); Adam Meekings, Bexley (GB); Daniel Woods, Ipswich (GB)

(73) Assignee: Michelson Diagnostics Ltd. (GB)

( * ) Notice: Subject to any disclaimer, the term of this patent is extended or adjusted under 35 U.S.C. 154(b) by 0 days.

(21) Appl. No.: 14/901,838

(22) PCT Filed: Jun. 27, 2014

(86) PCT No.: PCT/GB2014/051964
§ 371 (c)(1),
(2) Date: Dec. 29, 2015

(87) PCT Pub. No.: WO2015/001317
PCT Pub. Date: Jan. 8, 2015

(65) Prior Publication Data
US 2016/0225141 A1    Aug. 4, 2016

(30) Foreign Application Priority Data
Jul. 2, 2013   (GB) .................................. 1311833.6

(51) Int. Cl.
*G06K 9/00*   (2006.01)
*G06T 7/00*   (2017.01)
(Continued)

(52) U.S. Cl.
CPC .............. *G06T 7/0012* (2013.01); *G06T 7/12* (2017.01); *G06T 2207/10101* (2013.01); *G06T 2207/30088* (2013.01)

(58) Field of Classification Search
CPC ................ G06T 7/00; A61B 3/00; G06K 9/00
(Continued)

(56) References Cited

U.S. PATENT DOCUMENTS

| 2009/0306520 | A1 | 12/2009 | Schmitt et al. |
| 2011/0034803 | A1* | 2/2011 | Stetson ................... G06T 15/08 600/425 |
| 2014/0094678 | A1* | 4/2014 | Traboulsi ............... A61B 90/39 600/407 |

FOREIGN PATENT DOCUMENTS

| CN | 101458212 | 6/2008 |
| CN | 101458212 | 6/2009 |

(Continued)

OTHER PUBLICATIONS

International Search Report and Written Opinion for PCT/GB2014/051964 dated Oct. 14, 2014.
(Continued)

*Primary Examiner* — Abolfazl Tabatabai
(74) *Attorney, Agent, or Firm* — Burns & Levinson LLP

(57) ABSTRACT

A method of processing optical coherence tomography (OCT) scans of a subject's skin (7), the skin (7) having a surface (8), the method comprising capturing a plurality of scans through the subject's skin (7), the scans representing an OCT signal in slices through the user's skin (7) in parallel planes, the scans being offset from one another along a direction perpendicular to the parallel planes, the method comprising determining the position of the surface (8) of the skin (7) in each scan and displaying the scans to a user with an indication (9) indicative of a predetermined depth below the surface (8) of the skin (7) visible to the user.

21 Claims, 4 Drawing Sheets

(51) Int. Cl.
*G06T 7/12* (2017.01)
*A61B 6/00* (2006.01)
*A61B 5/05* (2006.01)

(58) Field of Classification Search
USPC ............ 382/128–134; 378/4, 8, 21–27, 901; 600/425
See application file for complete search history.

(56) References Cited

FOREIGN PATENT DOCUMENTS

| CN | 102046071 | | 5/2011 |
|---|---|---|---|
| JP | 2006000385 | A | 1/2006 |
| JP | 2007225349 | A | 9/2007 |
| JP | 2008073099 | A | 4/2008 |
| JP | 2011062301 | A | 3/2011 |
| RU | 2007131190 | A | 2/2009 |
| WO | 2010080576 | A1 | 7/2010 |

OTHER PUBLICATIONS

United Kingdom Intellectual Property Office Search Report for GB1311833.6 dated Jan. 29, 2014.
Hiori, Y. et al. "Automatic characterization and segmentation of human skin using three-dimensional optical coherence tomography." Optics Express, vol. 14, No. 5, pp. 1862-1877 (Mar. 2006).
Korotkov, K. et al. "Computerized analysis of pigmented skin lesions: A review." Artificial Intelligence in Medicine, vol. 56, No. 2, pp. 69-90 (Oct. 2012).
Hojjatoleslami, A. et al. "OCT skin image enhancement through attenuation compensation." Applied Optics, vol. 51, No. 21, pp. 4927-4935 (Jul. 2012).
Chinese Search Report, Chinese Application No. 2014800362072, 2 pages, dated Oct. 25, 2017.

\* cited by examiner

PROCESSING OPTICAL COHERENCE TOMOGRAPHY SCANS OF A SUBJECTS SKIN

CROSS-REFERENCE TO RELATED APPLICATIONS

This application is a U.S. national stage application under 35 U.S.C. 371 of International Application No, PCT/GB2014/051964 filed on Jun. 27, 2014 and entitled PROCESSING OPTICAL COHERENCE TOMOGRAPHY SCANS OF A SUBJECT'S SKIN, which in turn claims priority to Great Britain Patent Application No, 1311833.6, filed on Jul. 2, 2013, which is incorporated by reference herein in its entirety for all purposes.

This invention relates to methods of processing optical coherence tomography (OCT) scans of a subject's skin, and to related apparatus.

Optical Coherence Tomography (OCT) was invented in 1991 at the Massachusetts Institute of Technology in the United States of America and is commonly used for imaging human tissue of various organs, in particular the eye, and also skin (J. Welzel, "Optical coherence tomography in dermatology: a review," Skin Research and Technology, vol. 7, pp. 1-9, 2001). In particular, we are aware of the VivoSight® OCT device, manufactured and marketed by Michelson Diagnostics Ltd of Orpington, Kent, United Kingdom, which is designed for use by professional dermatologists in the assessment of skin lesions of patients.

The VivoSight OCT device scans the skin and presents to the user images of the skin subsurface structure, in a plane perpendicular to the skin surface (By convention, the OCT device is assumed to be positioned vertically above the skin surface). The resulting two-dimensional image is commonly known in the art as a "B-scan", and comprises many lines of vertical pixels commonly known in the art as "A-lines". Each pixel in the image has a value corresponding to the signal obtained from the OCT device resulting from the skin optical properties at the y-position for that pixel. Also, the VivoSight device can acquire scans at multiple locations across the skin surface in order to build up a series of B-scans across a lesion of interest. This is known in the art as a multi-slice "stack" and can be viewed by the user in a variety of ways to elicit tissue features of medical interest such as nests of cancer cells.

For example, the user can view the stack of B-scans in rapid succession to fly through a lesion area. Also, the stack of data can be re-sampled so that one or more image slices in the horizontal plane (perpendicular to the B-scans) can be extracted and viewed. Horizontal slices are sometimes known in the art as "C-scans". Thus, the C-scan at any desired depth can be viewed. Furthermore, a C-scan and B-scan from a stack can be viewed simultaneously. All of this is well known to those skilled in the art of OCT and more generally medical imaging.

Dermatologists are interested in imaging skin for many reasons, but in particular they are interested in imaging skin cancer cell conglomerations or "nests", and determining how deep in the skin the nests extend. This is because some of the available treatments are only effective for shallow cancers, but these treatments are less invasive and result in much better cosmetic outcome than surgery which is used for deeply penetrating cancers. However, there is no easy way for the dermatologist to determine the depth and extent of cancer nests except by imaging with OCT and viewing the images. In particular, dermatologists desire to know whether a given cancer nest extends at least 1 mm below the surface of the skin, as this has been determined to be a critical depth determining prognosis and therefore the treatment regime to be applied and is known in the art as the "Breslow Depth" in the case of malignant melanoma.

The VivoSight device provides a simple means of measuring the depth of lesions, by drawing an arrow on the B-scan from the top surface of the skin to the lesion boundary, the length of the arrow being shown on the scanner display. However, this is a time consuming manual process.

According to a first aspect of the invention, there is provided a method of processing optical coherence tomography (OCT) scans of a subject's skin, the skin having a surface, the method comprising capturing a plurality of scans through the subject's skin, the scans representing an OCT signal in slices through the user's skin in parallel planes, the scans being offset from one another along a direction perpendicular to the parallel planes, the method comprising determining the position of the surface of the skin in each scan and displaying the scans to a user with an indication indicative of a predetermined depth below the surface of the skin visible to the user.

As such, we have appreciated that it is advantageous to the user to be able to determine easily where contours of depth are in OCT scans. In particular, given the use of the Breslow depth to describe how deeply melanoma cells have penetrated the skin, the present method allows a skilled clinician to judge more easily how deeply seated a melanoma is in the skin.

The indication may be a contour indicative of the predetermined depth; alternative, those areas of the scan that are deeper than the predetermined depth may be differently presented to the user, such as in a different colour.

The method may comprise the user selecting the predetermined depth. In any case, the predetermined depth may represent a depth of between 0.75 millimetres and 1.5 millimetres below the skin's surface; preferably, the predetermined depth will represent a depth of 1 millimetre below the skin's surface.

The method may comprise sequentially displaying each scan to the user. Thus, the user can then sequentially flick through the scans, with the appropriate indication being displayed, so that the user can determine whether there are any features of note, typically deeper than the predetermined depth.

The method may comprise generating a three-dimensional model of the user's skin from the scans. The method may then comprise displaying a slice through the model non-parallel to the scans with the indication showing the predetermined depth below the surface in the slice. This allows a user to view a slice through the user's skin in any desired plane. Alternatively or additionally, the method may comprise displaying a two-dimensional projection of the three-dimensional model to the user, with the indication showing the predetermined distance below the surface.

The parallel planes may be approximately or generally perpendicular to the surface of the skin; thus, the scans may be B-scans.

However, in an alternative embodiment, the parallel planes may be approximately or generally parallel to the surface of the skin; each scan may therefore be a C-scan. A disadvantage of viewing C-scans in order to judge the depth of a cancer nest is that the C-scan is a flat plane, whereas the surface of the skin is not flat, and this means that the depth below the surface of every point in the C-scan is not a fixed value but varies across the C-scan, and it is therefore not easy to judge from a C-scan whether or not a nest visible in the C-scan is above or below the critical depth below the skin surface.

According to a second aspect of the invention, there is provided a method of processing optical coherence tomography (OCT) scans of a subject's skin, the skin having a surface, the method comprising capturing a plurality of scans through the subject's skin, the scans representing slices through the user's skin in parallel planes, the scans being offset from one another along a direction perpendicular to the parallel planes, the method comprising determining the position of the surface of the skin in each scan and then displaying at least one image representative of the scans to the user such that all points in the image along a line (typically horizontal) in the image are at the same depth below the skin's surface.

Rather than displaying a contour or other indication, this method has the effect of flattening the skin's surface, so all points along the (typically horizontal) line are at the same depth.

Preferably, the line is along a direction and there is a plurality of lines in each image, all of the points along each line being at the same depth below the surface of the skin. Typically, the depth will vary between different lines; preferably, the lines will be arranged in order of increasing or decreasing depth. Such an arrangement is akin to a B-scan, but renormalized so that one direction through the image (generally perpendicular to the direction) consistently corresponds to depth below the skin surface (rather than depth below the OCT sensor). Typically, the lines of consistent depth will be horizontal in the image, along the width of the image.

However, in an alternative embodiment, all points in the image will be the same depth below the skin. As such, the entire image is at the same depth below the skin's surface. This is therefore akin to a C-scan, but with the depth below the skin's surface constant rather than the distance below the OCT sensor being constant. In this embodiment, it is clear that if the depth is set at a critical depth (for example, the Breslow depth) and a cancer nest is visible in the image wholly or in part, then the cancer nest must extend downwards below the critical depth.

For either aspect of the invention, the step of determining the position of the surface of the skin in each scan may comprise a detection of a continuous sharp change in the OCT signal, typically in the vertical direction. Over the scales taken by an OCT apparatus (of the order of a cube with a side of a few millimetres), the skin surface will be represented by an abrupt change in the OCT signal in one dimension, typically in the vertical direction, but one that is continuous in two dimensions in the other directions. As such, the method may comprise building a three-dimensional model of the skin, and searching for a change in the three-dimensional model that forms a continuous two-dimensional surface.

The method of determining the position of the skin surface may also include determining the surface roughness of the skin. This is a useful yet surprising by-product of knowing the location of the skin. The skin roughness may be measured as any of the mean deviation of the skin position ($R_a$), the range of the skin position from highest peak to lowest valley ($R_z$) or the root mean square deviation of the skin position ($R_q$). The calculation of such parameters is well known, but the present method provides a new source for the source data.

The method of either invention may be carried out on a suitable processor coupled to a display. The processor and display may be that of an OCT apparatus.

According to a third aspect of the invention, there is provided an optical coherence tomography (OCT) image processing apparatus, comprising a processor, a display coupled to the processor and storage coupled to the processor, the storage carrying program instructions which, when executed on the processor, cause it to carry out the method of either of the first two aspects of the invention.

The image processing apparatus may comprise an OCT apparatus by means of which the OCT scans are captured. As such, the image processing apparatus may comprise an OCT probe arranged to generated interferograms, and the processor may be arranged to generate the images from the interferograms. As such, the image processor may be arranged to process the images as they are captured.

Alternatively, the image processing apparatus may be separate from any OCT apparatus and may be arranged to process the images subsequent to their capture. As such the image processing apparatus may comprise data reception means (such as a network connection or media drive) arranged to receive the images for processing.

According to a fourth aspect of the invention, there is provided a method of processing optical coherence tomography (OCT) scans of a subject's skin, the skin having a surface, the method comprising capturing a plurality of scans through the subject's skin, the scans representing slices through the user's skin in parallel planes, the scans being offset from one another along a direction perpendicular to the parallel planes, the method comprising determining the position of the surface of the skin in each scan.

There now follows, by way of example only, description of an embodiment of the invention, described with reference to the accompanying drawings, in which.

Figure 1:
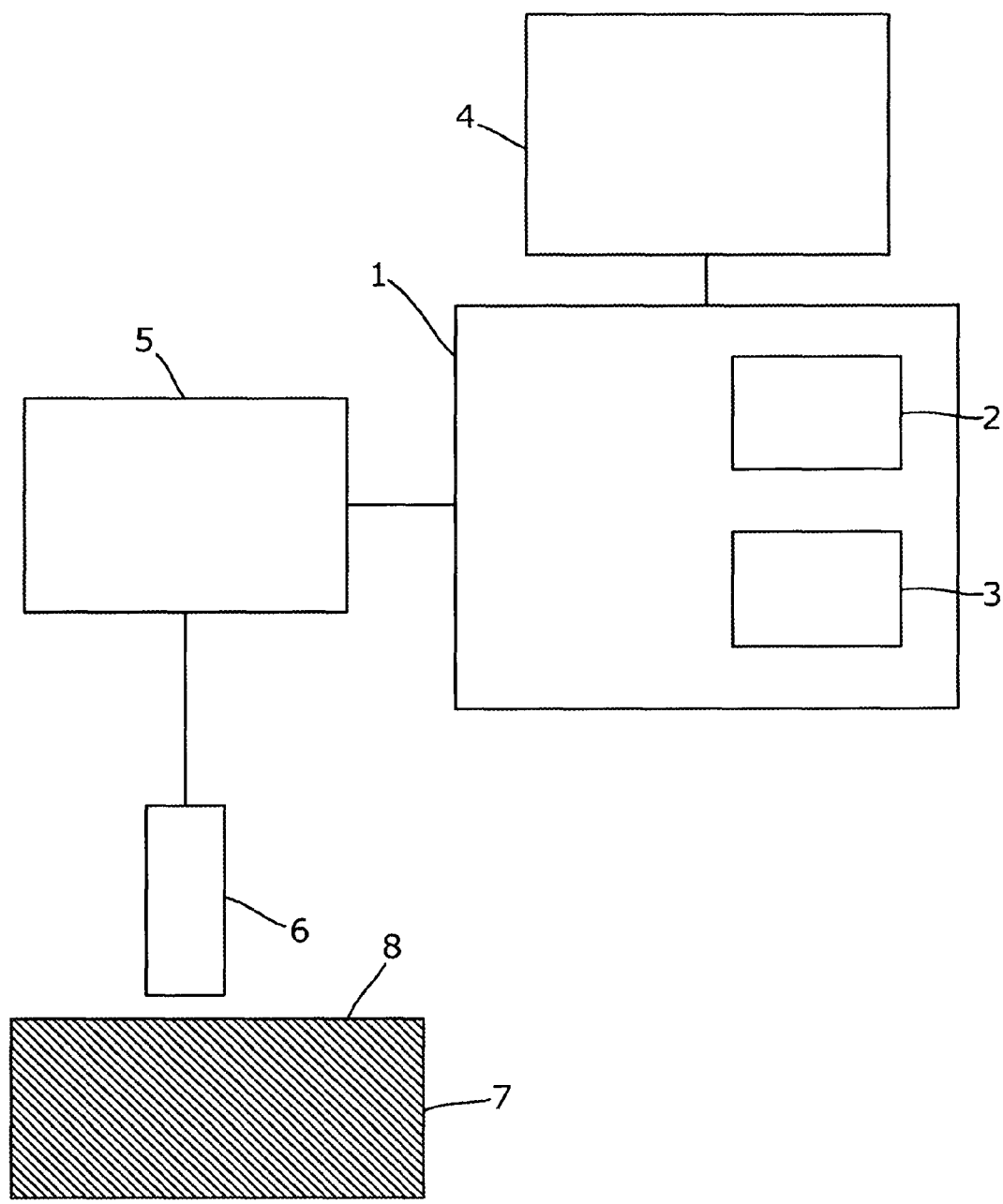
FIG. 1 shows schematically an optical coherence tomography (OCT) apparatus in accordance with an embodiment of the invention.

An optical coherence tomography (OCT) apparatus in accordance with an embodiment of the invention is shown in FIG. 1 of the accompanying drawings. This comprises a computer 1, having a processor 2 and storage 3 (such as a mass storage device or random access memory) coupled to the processor 2. The storage 3 contains data and processor instructions which cause the processor 2 to act as is described below. The computer 1 can be any suitable model; typically a personal computer running an operating system such as Microsoft® Windows® or Apple® Mac OS X® can be used. The computer 1 is also provided with a display 4 controlled by the processor 2 on which any desired graphics can be displayed.

The apparatus further comprises an OCT interferometer 5 and associated probe 6. The interferometer 5 interferes light reflected from sample 7 (here, a subject's skin) through probe 6 with light passed along a reference path to generate interferograms. These are detected in the interferometer 5; the measured signal is then passed to the computer 1 for processing. Example embodiments of suitable OCT apparatus can be found in the PCT patent application published as WO2006/054116 or in the VivoSight® apparatus available from Michelson Diagnostics of Orpington, Kent, United Kingdom.

Such OCT apparatus typically generate multiple B-scans: that is, scans taken perpendicularly through the skin 7. The result of analysis of each interferogram is a bitmap in which the width of the image corresponds to a direction generally parallel to the skin surface and the height corresponds to the depth from the sensor into the skin. By taking many parallel scans, a three-dimensional stack of bitmaps can be built up.

Figure 2:
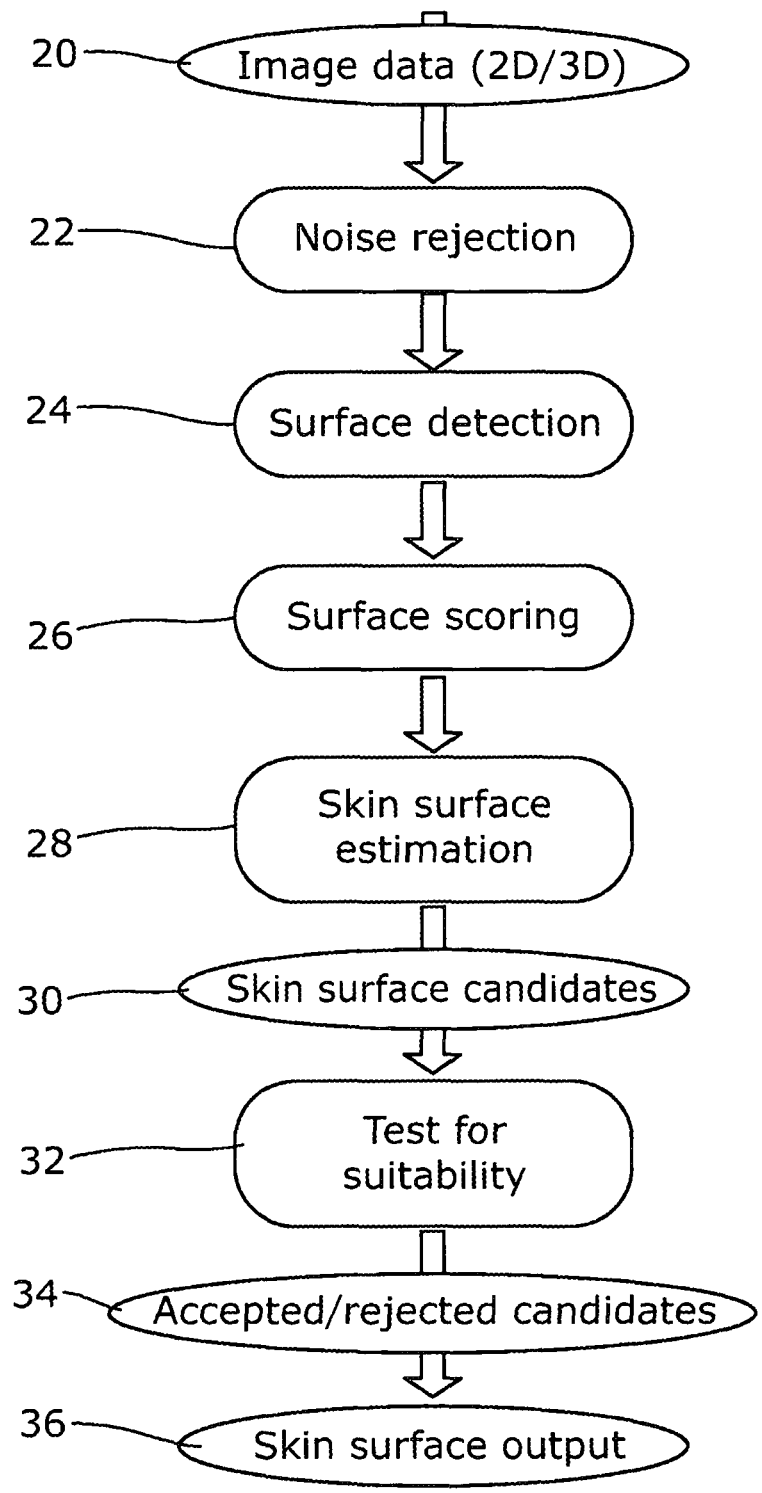
FIG. 2 shows a flowchart depicting how the apparatus of FIG. 1 determines the position of the skin surface.

The apparatus takes this stack and determines the position of the surface 8 of the skin in the image. It does this by carrying out the method shown in FIG. 2 of the accompanying drawings.

At step 20, a three-dimensional stack of OCT interferograms is built up. At step 22, in the preferred embodiment, the image data is filtered to reduce or remove random noise inherent of the coherent detection technique ('speckle noise') and other image artefacts particular to the imaging system used to capture the image data. The reduction in the effect of noise upon image contrast is achieved using linear and non-linear filtering techniques, intended to preserve edge features while removing speckle. Examples of such filters include linear filters, Kalman filters (see, for example, Igor Gurov and Maxim Volynsky "Recurrence signal processing in Fourier-domain optical coherence tomography based on linear Kalman filtering", Proc. SPIE 8792, Optical Methods for Inspection, Characterization, and Imaging of Biomaterials, 879203 (May 23, 2013); doi:10.1117/12.2020615; http://dx.doi.org/10.1117/12.2020615) or wavelet filters (see, for example, "Speckle reduction in optical coherence tomography images of human finger skin by wavelet modified BM3D filter", Bo Chong, Yong-Kai Zhu, Optics Communications Volume 291, 15 Mar. 2013, Pages 461-469, http://dx.doi.org/10.1016/j.optcom.2012.10.053).

The unadulterated proximal tissue surface represents a refractive index change from that of air to that of tissue and therefore presents a very strongly backscattering feature and high signal in OCT images. At step 24, to obtain candidates for skin surfaces in images, therefore, the image A-lines are filtered to indicate extrema in the OCT signal; certain of these are rejected based on simple parameters (position, classification and the local environment of the extrema, such as the difference between the positions of the extrema in adjacent images). Further edge-filtering may be employed to refine results and ensure that the estimations of skin surface are minimally affected by remaining speckle or a poorly-backscattering skin surface (in the presence of, for example, media which reduces or minimises the difference in refractive index at the proximal side of the skin surface).

The result of this stage is a 3D binary array of possible surface positions, with multiple solutions possible in each A-scan of the data array.

The process in step 24 may typically result in multiple candidates for the proximal skin surface. Step 26 is undertaken therefore to assign a score to each candidate in each A-scan according the probability that it does not represent the true skin surface. This algorithm may involve multiple independent estimates of probability and combine these in a suitable manner to provide a meaningful metric.

In step 28, the set of multiple skin surface candidates and their weights are then processed to select a set of candidates 30 representing a single surface. The algorithm employed to select this surface attempts to minimise the sums of the weights of candidates in the selected surface and also a weight assigned to the Euclidean distance between neighbouring candidates in the selected surface.

In step 32, the surface 30 selected in step 28 is assessed for suitability according to criteria based on a-priori knowledge of skin morphology, the result of this assessment is termed herein "the worthiness" of the surface. The criteria may include uniformity, periodicity of variation, surface variance amongst other factors, all being within expected limits from known skin samples. If an insufficient worthiness is attained, according to a prescribed value, the solution is rejected (at step 34) and steps 26, 28 and 32 repeated using an additional weighting factor derived in this step. The additional weighting assigned to the multitude of candidates in the repeated step 28 may be calculated based on the position of the surface and its overall worthiness as well as localised contribution to the worthiness of particular candidates.

As part of the determination of the skin surface position, it is also convenient to determine the roughness of the skin surface. Three parameters, the mean deviation of the skin position ($R_a$), the range of the skin position from highest peak to lowest valley ($R_z$) or the root mean square deviation of the skin position ($R_q$) can be measured. In order to eliminate the effect of large-scale surface undulations (such as, for example, skin surface inclination relative to the imaging probe, caused by inaccurate probe positioning) without making undue requirements of the user, skin surface topography is measured by calculating the deviation of the detected skin surface from the corresponding point in a calculated mean skin surface. This mean skin surface is calculated using a spatial low-pass filter and mathematically fitting a smooth-curved surface to the resultant profile; see, for example Kottner, J., Schario, M., Bartels, N. G., Pantchechnikova, E., Hillmann, K. and Blume-Peytavi, U. (2013), Comparison of two in vivo measurements for skin surface topography. Skin Research and Technology, 19: 84-90. doi: 10.1111/srt.12009, or B-G Rosén et al (2005) On in-vivo skin topography metrology and replication technique, J. Phys.: Conf. Ser. 13 325 doi: 10.1088/1742-6596/13/1/076.

The result of this method is a determination of the position through the stack of bitmaps of the position of the skin surface. This can then be used to simplify the analysis of the captured images by clinicians. This can be achieved in number of ways, but in each case relies upon Breslow's depth. The depth of extent of a tumour such as a melanoma below the skin has been found to be indicative of how likely that tumour is to metastasise. Typically, tumours up to 1 millimetre below the surface of the skin are unlikely to metastasise, whereas those which extend more than 1 millimetre below the surface of the skin are more likely to do so.

Figure 3:
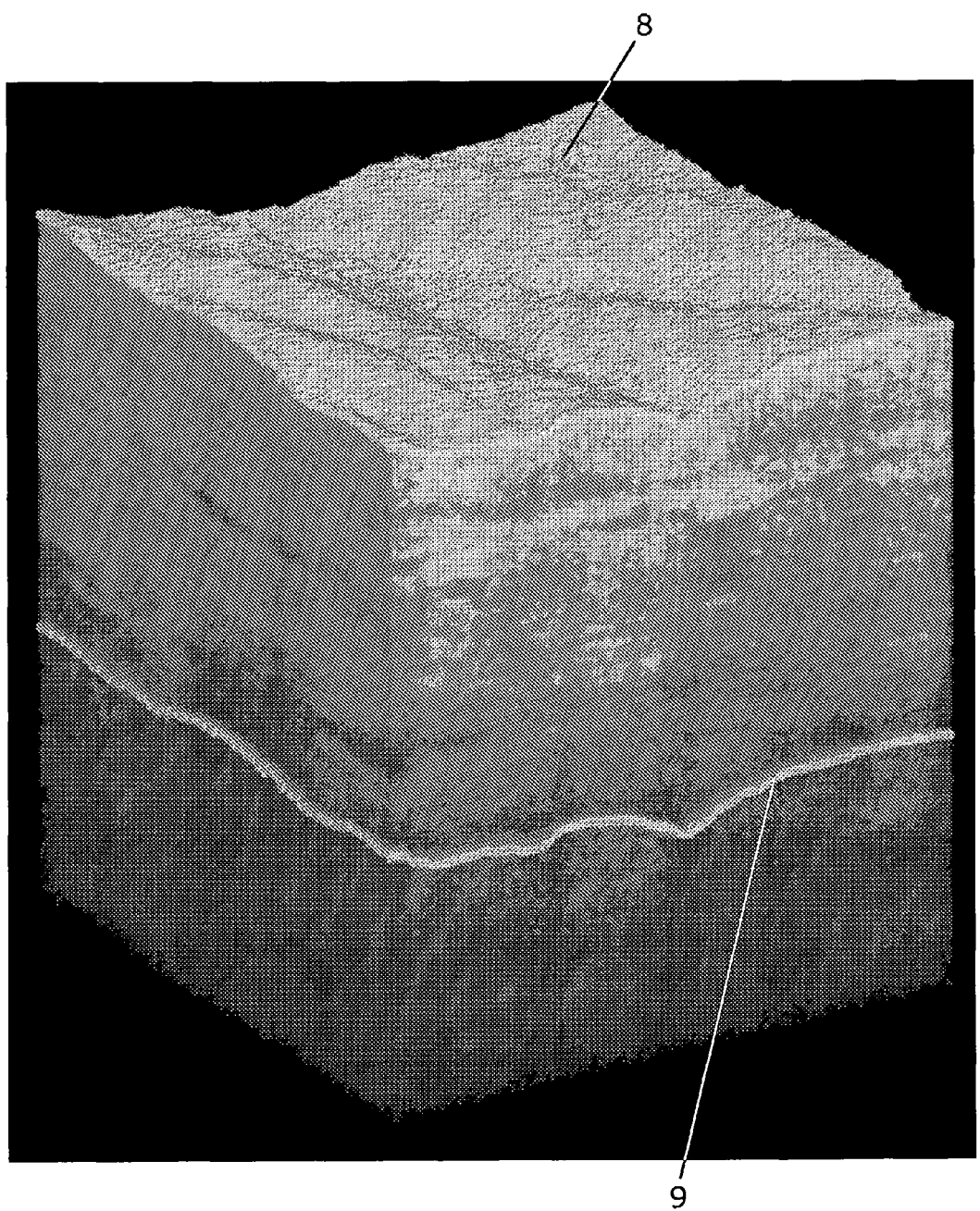
FIG. 3 shows a three-dimensional bitmap stack generated by the apparatus of FIG. 1, with a contour depicting a given depth below the skin surface.

In one example, given that the position of the skin is known, the position of the contour a given depth here 1 mm, but selectable by the user below the surface can be shown to the user on the display 4. An example of such a display is shown in FIG. 3 of the accompanying drawings. This shows the stack as a two-dimensional projection of a three-dimensional block, highlighting the skin surface 8 and the contour 9, which is shown on two faces of the stack. Alternatively, individual two-dimensional B-scans can be shown to the user with the contour 9 in place; a user can then skip through the scans to see the shape of structures through the scan in the manner of a flipbook.

The display of the contour 9 is useful to the user as they can use it to quickly determine if a given structure (e.g. a melanoma) extends more than the selected depth below the skin surface, as they can simply determine whether it extends below the contour 9.

In an alternative, instead of showing the contour 9, the images can be rescaled so that a given direction—say the height—of the images shown to the user is no longer the depth from the probe 6 but instead is the depth below the skin surface 8. This merely requires the position of the skin surface 8 through the image to be determined, and then column in the images displayed being displaced upwards a corresponding number of pixels. The skin surface 8 will then appear as a flat surface, and the depth of structures within the skin can be determined simply by how far down the image they are.

Figure 4:
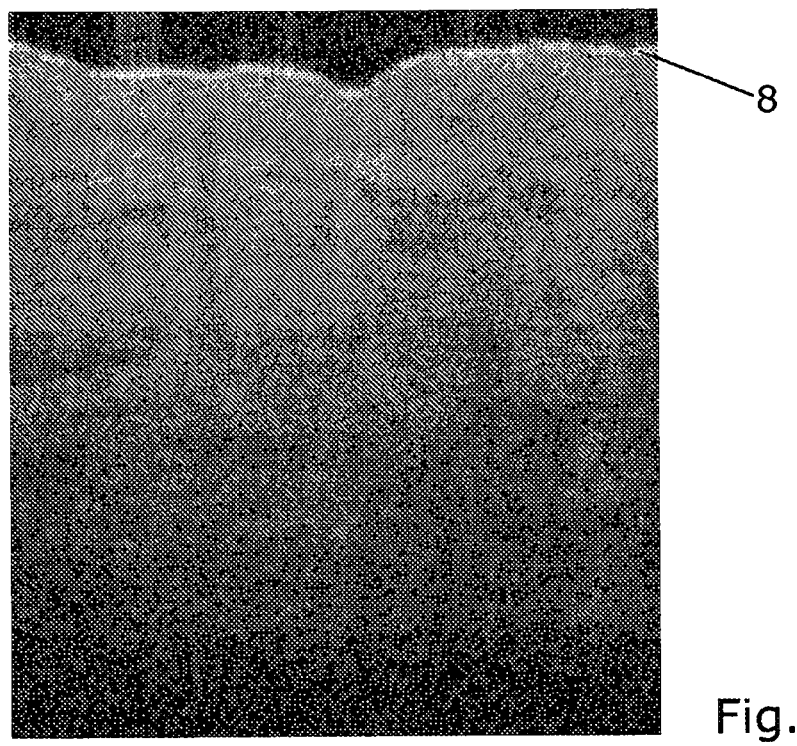
FIG. 4 shows a two-dimensional OCT B-scan through a subject's skin.
Figure 5:
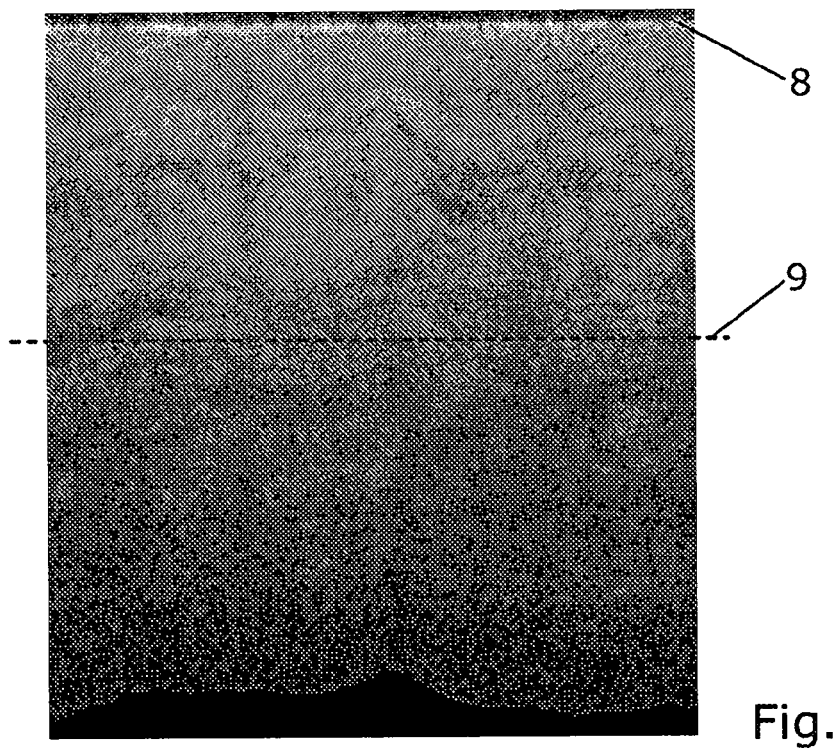
FIG. 5 shows the same image as FIG. 4, with the vertical axis of the image resealed so as to depict distance below the skin surface.

This can be seen in FIGS. 4 and 5 of the accompanying drawings. FIG. 4 shows a captured B-scan, in which (as shown in the Figures), the vertical axis shows the depth from the probe and the horizontal axis shows displacement at right angles to the depth. The skin surface 8 can be seen in this Figure as an undulating line.

FIG. 5 corresponds to FIG. 4, except that the position of the skin surface has be rescaled or normalised. As such, the skin surface 8 is now a flat horizontal line through the image. The vertical dimension now reflects distance below the skin surface 8, rather than distance from the probe. A scale can be provided if desired by a user. As such, it is now much easier to determine the depth of structures under the skin surface; in particular, Breslow's depth (or any other depth decided upon by a user) can be indicated by a simple line 9 across the image.

In another alternative, the apparatus can display images taken from the stack at a consistent depth below the surface of the skin. Akin to a C-scan, such a depth scan would show only features that were a given depth below the skin surface. Thus, a user could clearly determine what structures there are in the skin 7 sample at a given depth.

This enables the user to perform further analysis of the stack, for example if a cancer nest has been identified, determining its lateral extent at a given depth below the surface.

In yet another embodiment, the OCT device may collect data in the form of a stack of C-scans, rather than B-scans. If a sufficient number of C-scans are collected by the device, then the result is a 3D-stack of OCT data that can be processed analysed and viewed in the same way as a stack of B-scans described above.

The invention claimed is:

1. A method of processing optical coherence tomography (OCT) scans of a subject's skin using an optical coherence tomography (OCT) image processing apparatus comprising a processor, a display coupled to the processor and storage coupled to the processor, the skin having a surface, the method comprising:
   capturing a plurality of OCT scans through the subject's skin, the OCT scans representing an OCT signal in slices through the subject's skin in parallel planes, the OCT scans being offset from one another along a direction perpendicular to the parallel planes, and
   determining, using the processor, the position of the surface of the skin in each OCT scan and displaying the OCT scans to a user on the display with an indication indicative of a predetermined depth below the surface of the skin visible to the user;
   wherein determining, using the processor, the position of the surface of the skin comprises detecting an abrupt change in the OCT signal in one direction while the OCT signal is continuous in two dimensions in the other direction.

2. The method of claim 1, in which the indication is a contour indicative of the predetermined depth.

3. The method of claim 1, in which those areas of the scan that are deeper than the predetermined depth are differently presented to the user.

4. The method of claim 1, comprising the user selecting the predetermined depth.

5. A method of processing optical coherence tomography (OCT) scans of a subject's skin using an optical coherence tomgraphy (OCT) image processing apparatus comprising a processor, a display coupled to the processor and storage coupled to the processor, the skin having a surface, the method comprising:
   capturing a plurality of OCT scans through the subject's skin, the OCT scans representing an OCT signal in slices through the subject's skin in parallel planes, the OCT scans being offset from one another along a direction perpendicular to the parallel planes, and
   determining, using the processor, the position of the surface of the skin in each OCT scan and displaying the OCT scans to a user on the display with an indication indicative of a predetermined depth below the surface of the skin visible to the user; in which the predetermined depth represents a depth of between 0.75 millimetres and 1.5 millimetres below the skin's surface.

6. The method of claim 1, comprising sequentially displaying each scan to the user, with the indications being displayed.

7. The method of claim 1, comprising generating a three-dimensional model of the subject's skin from the scans.

8. The method of claim 7, comprising displaying a slice through the model non-parallel to the scans with the indication showing the predetermined depth below the surface in the slice.

9. The method of claim 7, comprising displaying a two-dimensional projection of the three-dimensional model to the user, with the indication showing the predetermined distance below the surface.

10. A method of processing optical coherence tomography (OCT) scans of a subject's skin using an optical coherence tomography (OCT) image processing apparatus comprising a processor, a display coupled to the processor and storage coupled to the processor, the skin having a surface, the method comprising:
    capturing a plurality of OCT scans through the subject's skin, the OCT scans representing an OCT signal in slices through the subject's skin in parallel planes, the OCT scans being offset from one another along a direction perpendicular to the parallel planes, and
    determining, with the processor, the position of the surface of the skin in each OCT scan and then displaying on the display at least one image representative of the OCT scans to the user such that all points in the image are at the same depth below the skin's surface;
    wherein determining, using the processor, the position of the surface of the skin comprises detecting an abrupt change in the OCT signal in one direction while the OCT signal is continuous in two dimensions in the other directions.

11. The method of claim 10, in which the step of determining the position of the skin in each scan comprises a detection of a continuous sharp change in the OCT signal.

12. The method of claim 11, in which the method comprises building a three-dimensional model of the skin, and searching for a change i.n the three-dimensional model that forms a continuous two-dimensional surface.

13. The method of claim 11, in which the method of determining the position of the skin also comprises determining the surface roughness of the skin.

14. An optical coherence tomography (OCT) image processing apparatus, comprising a processor, a display coupled to the processor and storage coupled to the processor, the storage carrying program instructions which, when executed on the processor, cause it to carry out the method of claim 10.

15. The apparatus of claim 14, comprising an OCT apparatus by means of which the OCT scans are captured.

16. The method of claim 10, were the position of the skin surface is not normalised to be flat.

17. The method of claim 10, in which the processor processes scans as they are captured.

18. The method of claim 10, in which the optical coherence tomography (OCT) image processing apparatus comprises an OCT apparatus, and in. which the scans are captured using the OCT apparatus.

19. The method of claim 10, in which the parallel planes are approximately or generally perpendicular to the surface of the skin.

20. The method of claim 10, in which the parallel planes are approximately or generally parallel to the surface of the skin.

21. A method of processing optical coherence tomography (OCT) scans of a subject's skin, the skin haying a surface, the method comprising:

capturing a plurality of OCT scans through the subject's skin, the OCT scans representing slices through the user's skin in parallel planes, the OCT scans being offset from one another along a direction perpendicular to the parallel planes, and determining, using a processor, the position of the surface of the skin in each OCT scan, in which the method of determining the position of the skin also comprises determining the surface roughness of the skin;

wherein determining, using the processor, the position of the surface of the skin comprises detecting an abrupt change in the OCT signal in one direction while the OCT signal is continuous in two dimensions in the other directions.

* * * * *